US012694803B2

(12) United States Patent
Gaston et al.

(10) Patent No.: US 12,694,803 B2
(45) Date of Patent: Jul. 28, 2026

(54) SYSTEM, DEVICE, AND METHOD FOR CUSTOMIZABLE SIGN CONTENT

(71) Applicant: IGT, Las Vegas, NV (US)

(72) Inventors: Nicholas Gaston, Reno, NV (US);
Chris Miggiani, Henderson, NV (US);
Steven Martens, Reno, NV (US);
Kevin Reasbeck, Reno, NV (US);
Dwayne Nelson, Las Vegas, NV (US);
Chris Wrightson, Falcon Heights, MN (US)

(73) Assignee: IGT, Las Vegas, NV (US)

( * ) Notice: Subject to any disclaimer, the term of this patent is extended or adjusted under 35 U.S.C. 154(b) by 37 days.

(21) Appl. No.: 18/753,783

(22) Filed: Jun. 25, 2024

(65) Prior Publication Data

US 2025/0391293 A1      Dec. 25, 2025

(51) Int. Cl.
*G06F 3/0484*          (2022.01)
*G06T 3/40*            (2024.01)

*G09F 9/30*            (2006.01)
*G09G 5/373*           (2006.01)

(52) U.S. Cl.
CPC .............. G09F 9/30 (2013.01); G06F 3/0484 (2013.01)

(58) Field of Classification Search
None
See application file for complete search history.

(56) References Cited

U.S. PATENT DOCUMENTS

2019/0163724 A1*    5/2019    Luttrell ................... G09G 5/26

* cited by examiner

*Primary Examiner* — John F Mortell
(74) *Attorney, Agent, or Firm* — Sheridan Ross PC

(57)          ABSTRACT

Systems, devices, and methods are provided to generate customized sign content. The method includes detecting a configuration of sign components connected to the system. The method also includes receiving user input indicating sign parameters. The method further includes generating customized sign content based on the configuration of the sign components and the sign parameters.

20 Claims, 14 Drawing Sheets

SYSTEM, DEVICE, AND METHOD FOR CUSTOMIZABLE SIGN CONTENT

BACKGROUND

The present disclosure is generally directed toward electronic sign components and, in particular, toward customizing electronic sign components within a casino environment.

Electronic sign components (e.g., lighted signs, lighting, screens, speakers, etc.) are usually situated throughout a casino next to electronic gaming machines (EGMs) that are used for various gameplay, such as video poker, slot games, keno, and the like. EGMs with the same game may be grouped together to form a bank of EGMs.

BRIEF SUMMARY

The present disclosure includes mechanisms to assist the operator to customize electronic sign content and to ensure that the customized content is appropriate and effective. EGMs and the associated sign components may have various configurations, and the sign content needs to be configured for each configuration.

Example aspects of the present disclosure include:

A system including a processor; and a memory coupled with and readable by the processor and storing therein instructions that, when executed by the processor, cause the processor to detect a configuration of sign components connected to the system; receive user input indicating sign parameters; and generate customized sign content based on the configuration of the sign components and the sign parameters.

A method includes detecting a configuration of sign components connected to a system; receiving user input indicating sign parameters; and generating customized sign content based on the configuration of the sign components and the sign parameters.

Any of the aspects herein, wherein the configuration of the sign components comprises a type, position, and location of each sign component connected to the system.

Any of the aspects herein, further comprising instructions that, when executed by the processor, cause the processor to request game package information from a gaming device; and generate the customized sign content at least partially based on the game package information.

Any of the aspects herein, wherein the sign parameters comprise at least one of: position, height, width, opacity, brightness, contrast, hue, frame rate, and volume.

Any of the aspects herein, further comprising instructions that, when executed by the processor, cause the processor to display a first tier of sign parameters and receive a user selection; and display a second tier of sign parameters, wherein sign parameters displayed in the second tier are based on the user selection in the first tier.

Any of the aspects herein, further comprising instructions that, when executed by the processor, cause the processor to receive a user selection of a preconfigured game theme; and generate the customized sign content at least partially based on the preconfigured game theme.

Any of the aspects herein, wherein the customized sign content cycles through multiple designs.

Any of the aspects herein, further comprising instructions that, when executed by the processor, cause the processor to detect a gameplay action; and change the customized sign content based on the detected gameplay action.

Any of the aspects herein, further comprising instructions that, when executed by the processor, cause the processor to receive an image for use in the customized sign content; determine that the received image is restricted for display; and in response to the received image being restricted for display, suggest an alternative image to display.

Any of the aspects herein, wherein the sign parameters available for user selection are based on a game configuration.

Any of the aspects herein, wherein the game configuration comprises at least one of: a game type, a game denomination, and a jackpot type.

Any of the aspects herein, further comprising instructions that, when executed by the processor, cause the processor to track performance of a gaming device associated with the sign components; and correlate performance of the gaming device with the customized sign content.

Any of the aspects herein, further comprising instructions that, when executed by the processor, cause the processor to configure customized sign content that changes dynamically based on a trigger; detect the trigger; and dynamically adjust the customized sign content based on the detected trigger.

Any of the aspects herein, further comprising instructions that, when executed by the processor, cause the processor to receive image data of sign components connected to the system; identify each sign component connected to the system in the image data; and determine the configuration of the sign components connected to the system based on the image data.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

Additional features and advantages are described herein and will be apparent from the following Description and the figures.

DETAILED DESCRIPTION

Figure 1A:
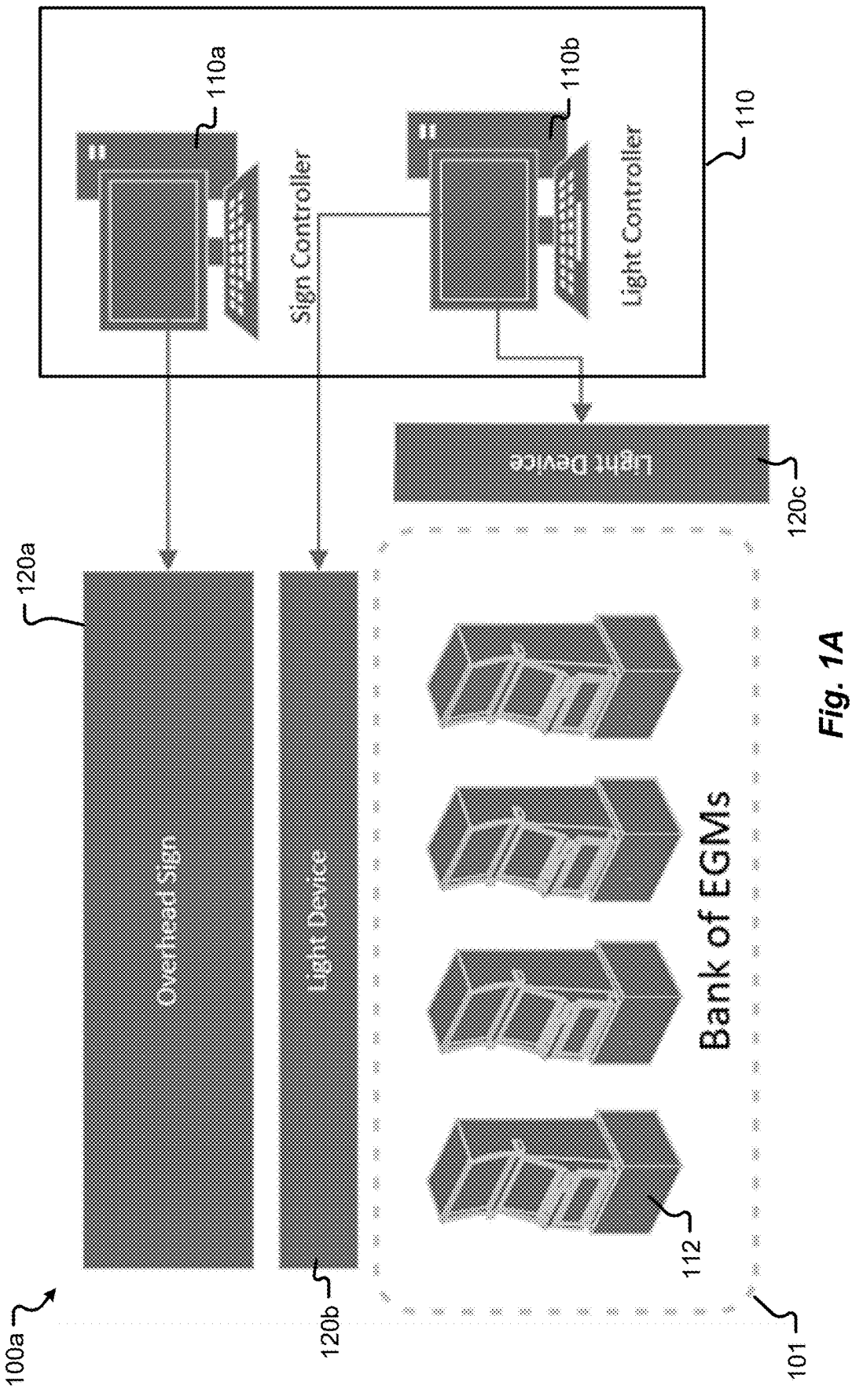
FIGS. 1A-1C are example game configurations in accordance with embodiments of the present disclosure.

Embodiments of the present disclosure will be described in connection with FIGS. 1A-10. While certain embodiments of the present disclosure will reference the use of a mobile device, such as a smartphone that communicates with a sign controller and/or sign components, it should be appreciated that embodiments of the present disclosure are not so limited. For instance, any computing device or collection of computing devices may be used to facilitate the customized electronic sign components as described herein.

The present disclosure describes systems and methods to generate customized sign content. The number, size, type, orientation, and location of the sign components can vary by installation (e.g., EGM layout), therefore, different sign content/configurations are necessary for different hardware configurations. In addition to different hardware configurations, there are multiple game themes, so in order to streamline the generation of customized sign content, the present disclosure allows an operator to generate customize sign content based on hardware configuration and sign parameters, including, but not limited to, operator brand, game theme, colors, and flair.

In embodiments, a hardware configuration may be received from a user. For example, a user interface (UI) may allow a user to drag and drop various hardware components (e.g., signs, screens, lighting, EGMs, etc.) into a specific configuration. In another example, the system may receive one or more images and use image recognition to identify a type and location of each sign component to determine the specific configuration of hardware components. In another example, the system may be able to detect the type (e.g., resolution, size, etc.), orientation, position, and location of connected sign components to determine the specific hardware configuration. In another example, the system may use a combination of user input, image recognition, and auto-detection to determine a configuration of sign components.

In embodiments, the UI provides a structure for generating customized sign content using hierarchical drop-down menus, with each subsequent tier showing options based on a selection in a previous tier. For example, a first tier may comprise a variety of themes Essentially the operator will have the ability to pick from a variety of themes (e.g., Asian, Egyptian, Wealth, Aztec, safari, underwater, etc.), based on the user selection of a theme in the first tier, different options may be presented in the second tier. The second tier may comprise a color selection (e.g., red, green, blue, gold, purple, etc.), based on the user selection of a color in the second tier, different options may be presented in a third tier. The third tier may comprise flair selection (e.g., gems, coins, fire etc.).

In embodiments, the system and methods described herein can obtain game information (e.g., images, game type, game theme, etc.) from an EGM and use the game information to generate customized sign content.

In embodiments, operators may upload their own images to use in the customized sign content. The system and methods described herein can determine if the uploaded image is restricted (e.g., copyrighted, inappropriate, inconsistent with the theme, etc.) and prevent the user for using the uploaded image. Additionally, the system and methods described herein may suggest alternative images similar to the restricted image that are not restricted.

The EGM and the other electronic sign components can be dynamic based on real-time game events (such as synced jackpot/high win celebration), increasing immersion & jackpot celebration prominence. Additionally, or alternatively, casino overhead lighting may also be used to amplify the effect when a jackpot is triggered on one machine (e.g., stroboscope, dimming, color change, etc.). In another example, the light effect could be triggered to appear to be "moving" towards the winner, drawing everyone's attention to a specific point. In embodiments, lighting and/or noise may be used to attract players to specific gaming machines. For example, when a bank of machines is not being played, electronic sign components located nearby may be triggered.

In embodiments, the system and methods described herein may track performance of EGMs and correlate the performance of a specific EGM or bank of EGMs with sign content. For example, if performance (e.g., gameplay) of an EGM or a bank of EGMs goes down after sign content is changed, the system and method described herein may notify an operator of the decrease in performance and suggest a change back to the previous sign content or other higher performing sign content.

FIG. 1A shows an example configuration 100*a* of a bank (101) of EGMs 112, associated sign components 120 (e.g., overhead sign 120*a* and light devices 120*b-c*), and a controller 110. The controller 110 may include a sign controller 110*a* and a light controller 110*b*, which may be separate devices or one device. The sign components 120 may show information about the bank (101) of EGMs 112 (e.g., game type (e.g., progressive non-progressive), game theme, current jackpot amount, etc.).

The controller 110 is connected to one or more sign components 120. The number, size and dimensions of the sign components 120 varies by installation and therefore different content is necessary for different hardware configurations. In some embodiments the EGMs 112, controller 110, and sign components 120 are all in communication with either other using Ethernet or wireless technology.

Figures 1B, 1C:
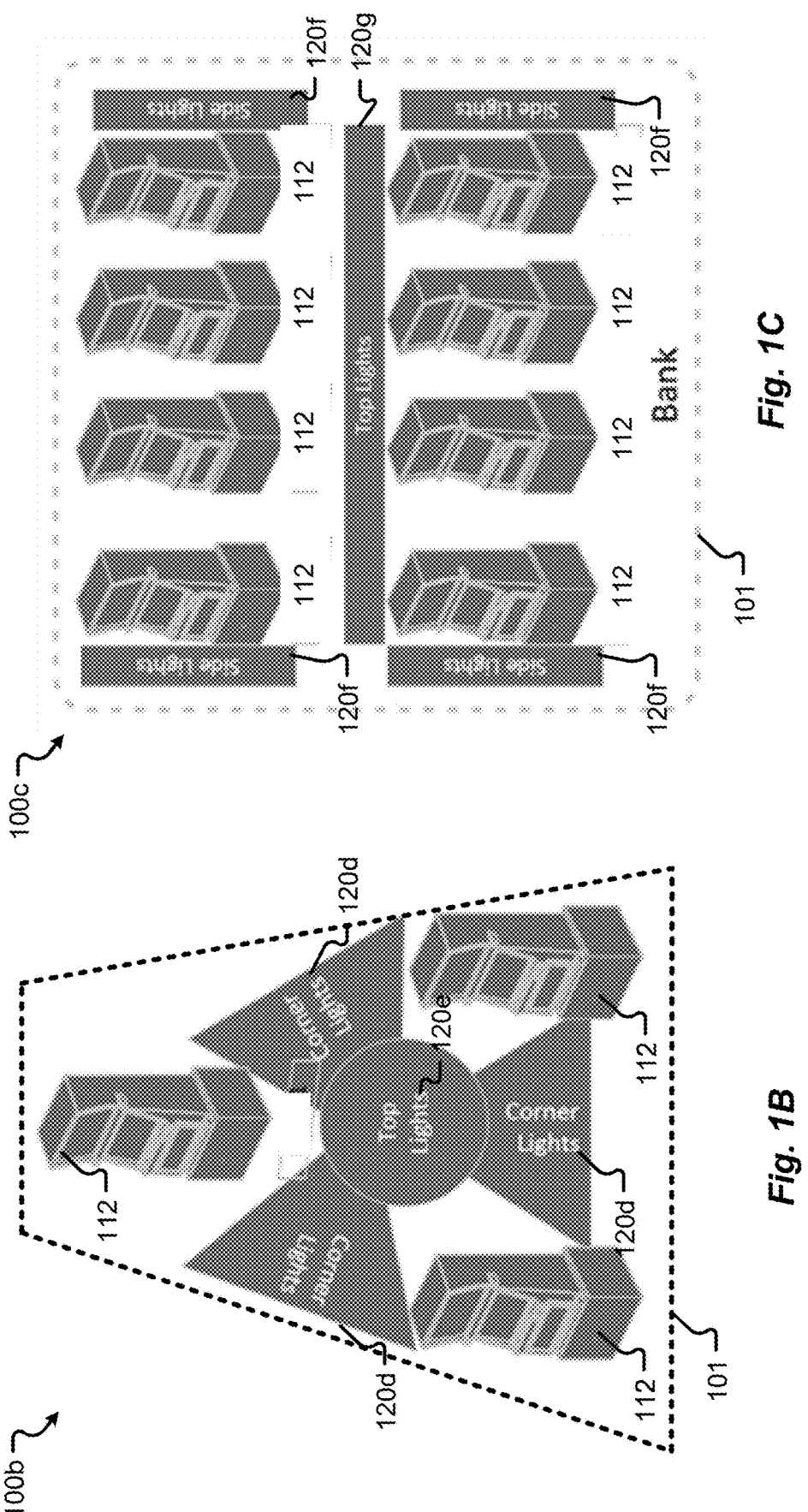

FIG. 1B illustrates another example configuration 100*b*, the EGMs 112 are configured in a pod configuration with sign components 120*d* between adjacent EGMS and top lights 120*e* above the pod.

FIG. 1C illustrates yet another example configuration 100*c*, a first bank (101) of EGMs 112 are positioned back-to-back with a second bank (101) of EGMs 112. Sign components 120*f* are located on both ends of each bank 101 and sign component 120g is located over the EGMs between the first bank 101 and the second bank 101. FIGS. 1A-1C are for illustrative purposes only and are non-limiting examples of various hardware configurations.

Figure 2:
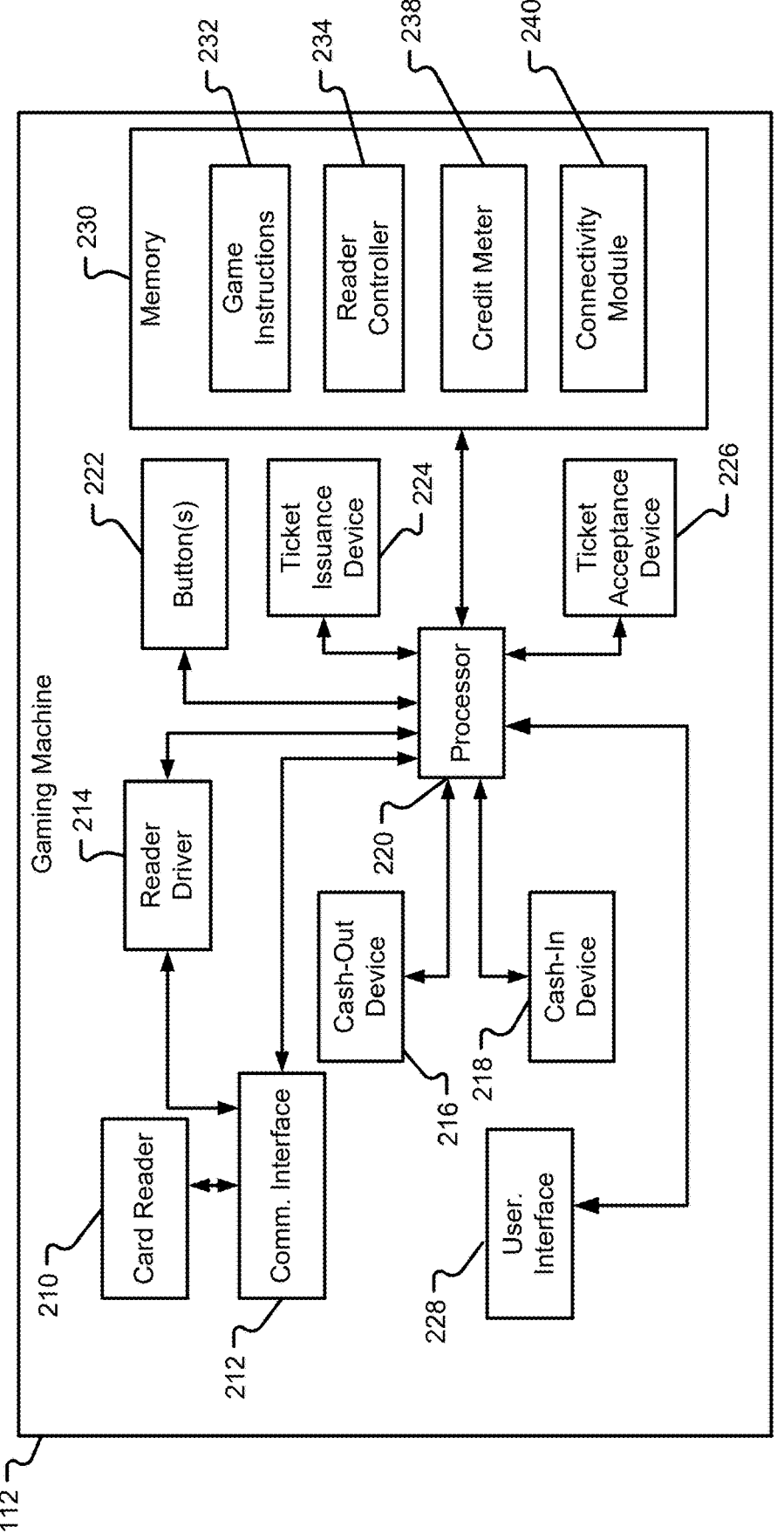
FIG. 2 is a block diagram of an example gaming machine in accordance with embodiments of the present disclosure.

With reference now to FIG. 2, additional details of a gaming machine 112 will be described in accordance with at least some embodiments of the present disclosure. While depicted as a gaming machine 112, it should be appreciated that some or all of the components of a single gaming machine 112 may be distributed across multiple gaming machines 112 (of the same or different type) without departing from the scope of the present disclosure.

The illustrative gaming machine 112 depicted in FIG. 2 is shown to include a card reader 210, a communication interface 212, a reader driver 214, cash-out device 216, cash-in device 218, a processor 220, buttons 222, ticket issuance device 224, ticket acceptance device 226, and memory 230. The memory 230 stores game instructions 232, reader controller 234, credit meter 238, and connectivity module 240. All elements of the gaming machine 112 may be considered to be coupled to one another, regardless of whether or not such coupling is direct or indirect. In other words, "coupling" as used herein does not necessarily require a direct communication between components.

Examples of a suitable communication interface 212 include, without limitation, an Ethernet port, a USB port, an RS-232 port, an RS-485 port, a NIC, an antenna, a driver circuit, a modulator/demodulator, etc. The communication interface 212 may include one or multiple different network interfaces depending upon whether one or multiple network connections are required to facilitate interactions with other systems (not shown). For instance, the gaming machine 112 may be provided with both a wired network interface and a wireless network interface without departing from the scope of the present disclosure. In some embodiments, the communication interface(s) 212 may include different communications ports that interconnect with various input/output lines.

Examples of suitable form factors that may be used for the card include, without limitation, magstripe cards, chip-based cards, contactless/wireless cards, key fobs, mobile communication devices, optically-readable cards, or the like. It should be appreciated that player's cards may be capable of being read by a reader 210 when brought within a predetermined distance of the reader 210 (e.g., if the reader 210 includes an antenna and is utilize a contactless communication protocol like Near Field Communications (NFC) or Bluetooth). Alternatively, or additionally, player's cards may be capable of being read by a reader 210 when inserted to a slot of a card reader 210 or swiped through a card reader 210.

The processor 220 may include one or multiple computer processing devices. In some embodiments, the processor 220 may include a microprocessor, a CPU, a microcontroller, or the like. The processor 220 may also be configured to execute one or more instruction sets stored in memory 230.

The memory 230 may include one or multiple computer memory devices that are volatile or non-volatile. The memory 230 may be configured to store instruction sets that enable a player interaction with the gaming machine 112. Examples of instruction sets that may be stored in the memory 230 include a game instruction set 232, a reader controller 234, and a connectivity module instruction set 240.

While the reader controller 234 is depicted as being provided in memory 230, it should be appreciated that functionality of the reader controller 234 may be provided in whole or in part by the reader driver 214. Thus, the reader controller 234 may be provided in the reader driver 214 without departing from the scope of the present disclosure. The reader controller 234 can be provided as software instructions, firmware instructions, combinations thereof, or the like.

The game instruction set 232, when executed by the processor 220, may enable the gaming machine 112 to facilitate one or more games of chance or skill and produce interactions between the player and the game of chance or skill. In some embodiments, the game instruction set 232 may include subroutines that present one or more graphics to the player via a user interface 228, subroutines that calculate whether a particular game wager has resulted in a win or loss during the game of chance or skill, subroutines for determining payouts for the player in the event of a win, subroutines for exchanging communications via the communication interface 212, and any other subroutine or set of instructions that facilitate gameplay at or in association with the gaming machine 112.

The reader controller 234, when executed by the processor 220 and/or reader driver 214, may enable functionality of the card reader 210. In some embodiments, the reader controller 234 may be configured to control the card reader 210 to read data from a player's card, register that a card read event has occurred at the card reader 210, extract data from the card during the card read event, and perform other operations in connection with managing the card reader 210.

The credit meter 238 may correspond to a device or collection of devices that facilitates a tracking of wager activity or available wager credits at the gaming machine 112. In some embodiments, the credit meter 238 may be used to store or log information related to various player activities and events that occur at the gaming machine 112. The types of information that may be maintained in the credit meter 238 include, without limitation, player information, available credit information, wager amount information, and other types of information that may or may not need to be recorded for purposes of accounting for wagers placed at the gaming machine 112 and payouts made for a player during a game of chance or skill played at the gaming machine 112. In some embodiments, the credit meter 238 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming machine 112, and the like.

The cash-in device 218 may include a bill acceptor, a coin acceptor, a chip acceptor or reader, or the like. In some embodiments, the cash-in device 218 may also include credit card reader hardware and/or software. The cash-out device 216 may operate and issue cash, coins, tokens, or chips based on an amount indicated within the credit meter 238. In some embodiments, the cash-out device 216 may include a coin tray or the like and counting hardware configured to count and distribute an appropriate amount of coins or tokens based on a player's winnings or available credit within the credit meter 238.

The gaming machine 112 may also be provided with a ticket acceptance device 226 that is configured to accept or scan physically-printed tickets/vouchers and extract appropriate information therefrom. In some embodiments, the ticket acceptance device 226 may include one or more machine vision devices (e.g., a camera, IR scanner, optical scanner, barcode scanner, etc.), a physical ticket acceptor, a shredder, etc. The ticket acceptance device 226 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code.

The ticket issuance device 224 may be configured to print or provide physical tickets/vouchers to players. In some embodiments, the ticket issuance device 224 may be configured to issue a ticket/voucher consistent with an amount of credit available to a player, possibly as indicated within the credit meter 238.

The button(s) 222 may correspond to any type of mechanical or software-based input device. In some embodiments, the button(s) 222 may be provided on a common panel or portion of the gaming machine 112 and may be used to initiate a predetermined function in response to being pressed by the player. A button 222, as can be appreciated, may alternatively or additionally take the form of one or more depressible buttons, a lever or "one armed bandit handle," etc. A button 222 may include one or more mechanically-actuatable components or may correspond to a predetermined area of a display that is configured to receive a user input.

Figure 3:
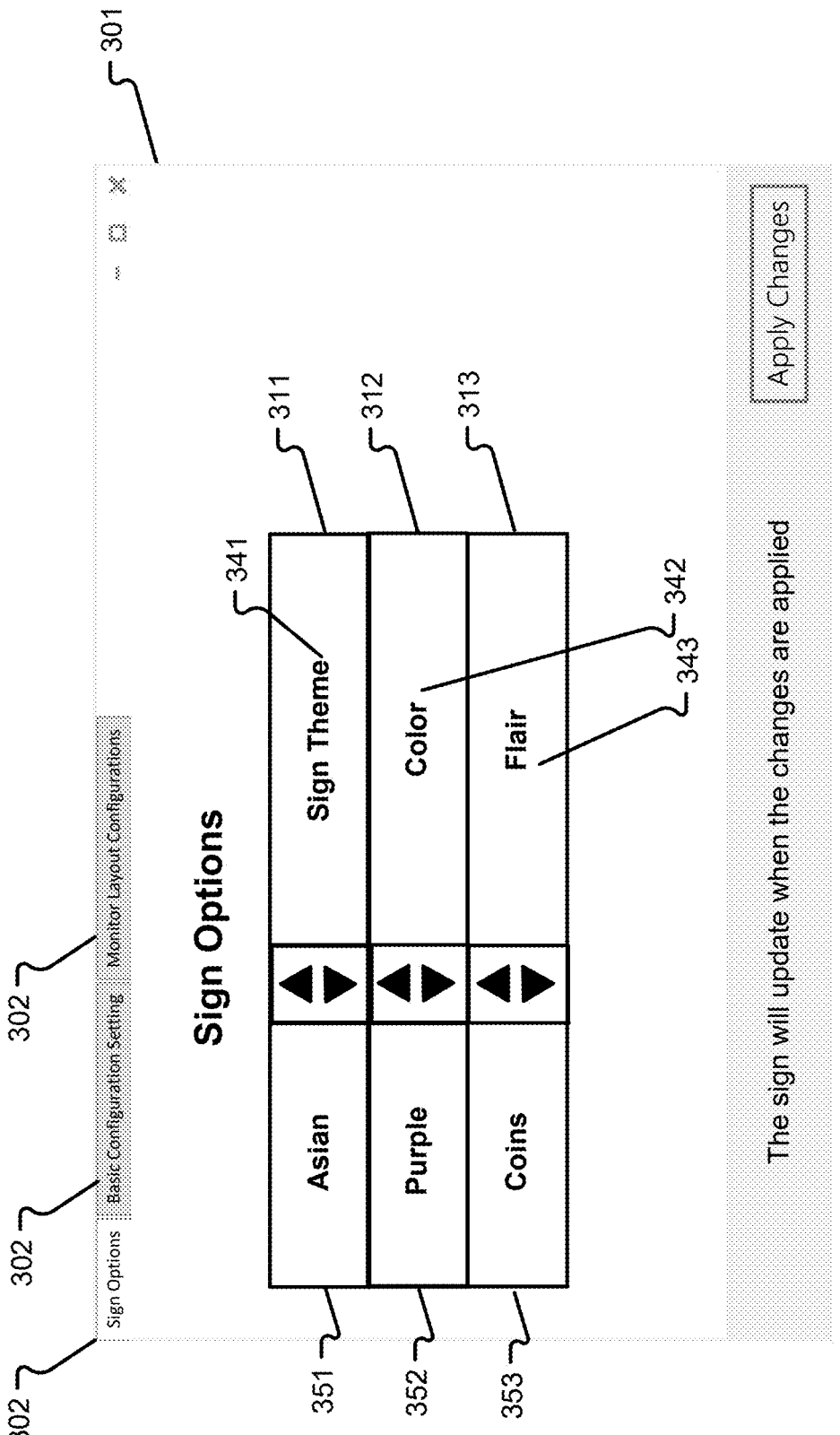
FIG. 3 is an example user interface (UI) in accordance with embodiments of the present disclosure.

With reference to FIG. 3 an example User Interface (UI) 301 is shown to assist a user to generate customized sign content. UI 301 includes multiple tabs 302, hierarchical drop-down menus 311-313, sign parameters 341-343, and user selections 351-352. While three tiers are shown (Sign Theme 341, Color 342 and Flair 343), it should be appreciated that many more tiers are possible. In one embodiment, the hierarchy of options guide the operator into making the selections. Making a choice in the first tier 311, narrows down the available options in the second tier 312. In this UI example 301, the operator chooses "Asian" for Sign Theme 341, then selects "Purple" for Color 342, and selects "Coins" for Flair 343. The controller 110 updates the sign content for the sign components 120 accordingly. Additionally, sign parameters may include attract options (e.g., "Hot New Game!" or "High Jackpot!").

Auto Setup

In one embodiment the controller 110 has an auto-setup option where the operator selects a game theme and the controller 110 selects the other sign parameters (e.g., sign theme, color, flair, etc.) based on the selected game theme. For example, if the selected game theme is "Cleopatra," the controller 110 may configure a sign theme 341 of "Egyptian" and color 342 of "Gold." The operator can adjust the parameters if desired.

In one embodiment the controller 110 has a database of game themes. In an embodiments, the controller 110 can communicate with one or more of the EGMs 112 on the bank 101 to learn the game theme, title, or game style. For example, the EGM 112 could report "Cleopatra," "Egyptian Themed," or "Game 12343," and then the controller 110 can search a database to determine how to configure sign components 120 for "Game 12343." In one embodiment the controller 110 learns this information not from the EGMs but rather from a game controller (which could be separate or part of the controller 110).

Random/Auto Generate Setup

In this example, the operator only selects the game theme (e.g., Asian), then selects "Auto generate" The controller 110 may randomly select a predetermined sign theme from all the variations of Asian sign themes.

In embodiments, sign content changes (e.g., new colors, new flairs, new images, etc.) at predetermined times set by the operator, random intervals throughout the day, and/or during specific gameplay activities (e.g., when a jackpot is awarded). This allows for the operator to have "new" sign content displayed throughout the day, keeping things fresh and exciting enhancing the players' experience.

Getting Content from Game Packages

Figure 4A:
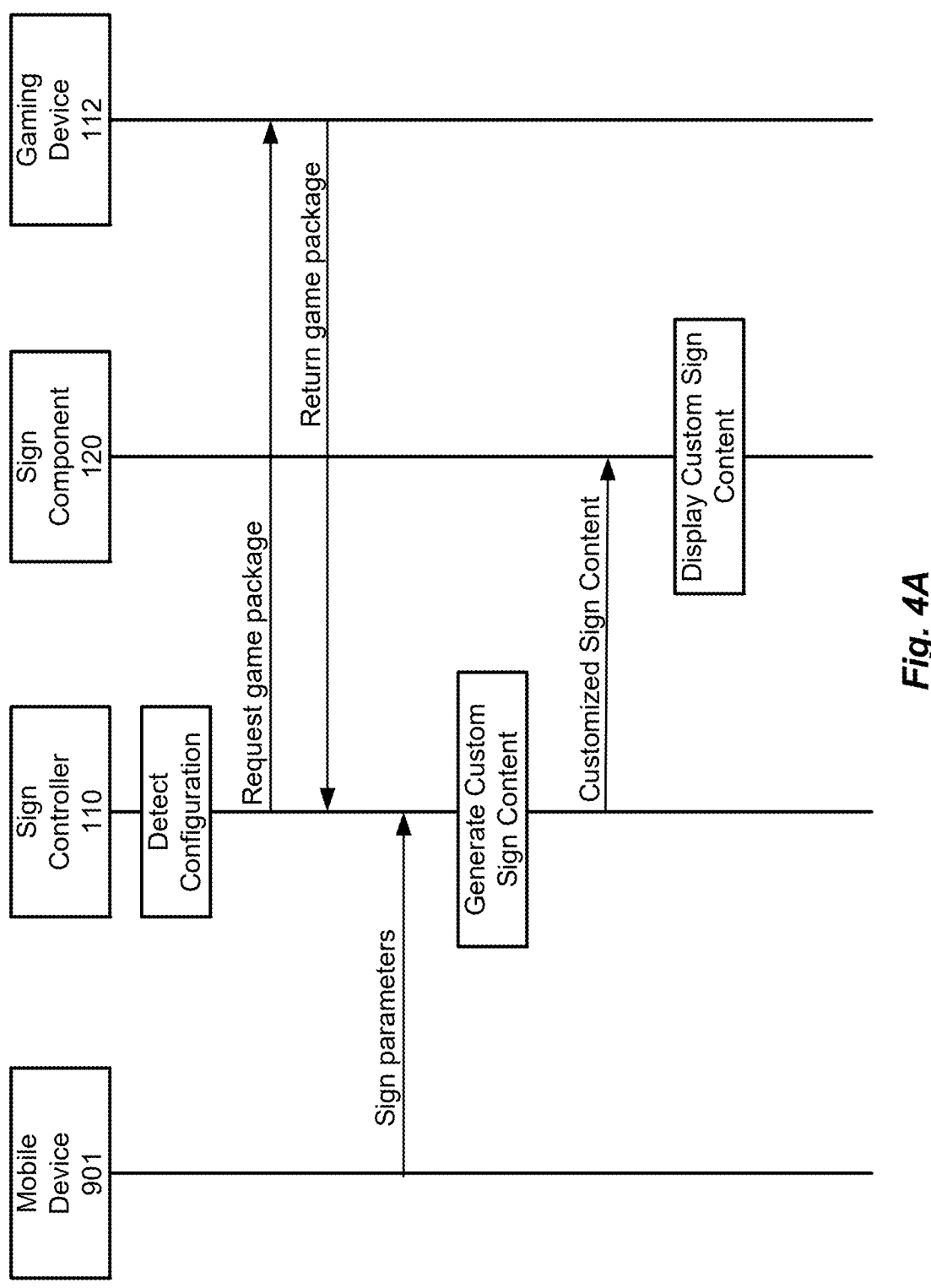
FIG. 4A is a diagram depicting a flow to obtain game package information in accordance with embodiments of the present disclosure.

In one embodiment the controller 110 obtains sign content (e.g., animations, pictures, sounds, or text) from the EGMs 112. As illustrated in FIG. 4A, before or after detecting a configuration of sign components 120, the controller 110 may request a game package (e.g., game package 502 illustrated in FIG. 5A) from the gaming device 112. The gaming device 112 returns game package information to the controller 110. For example, a game package 502 is packaged to contain one or more executables 506 and assets 504.

Figure 5A:
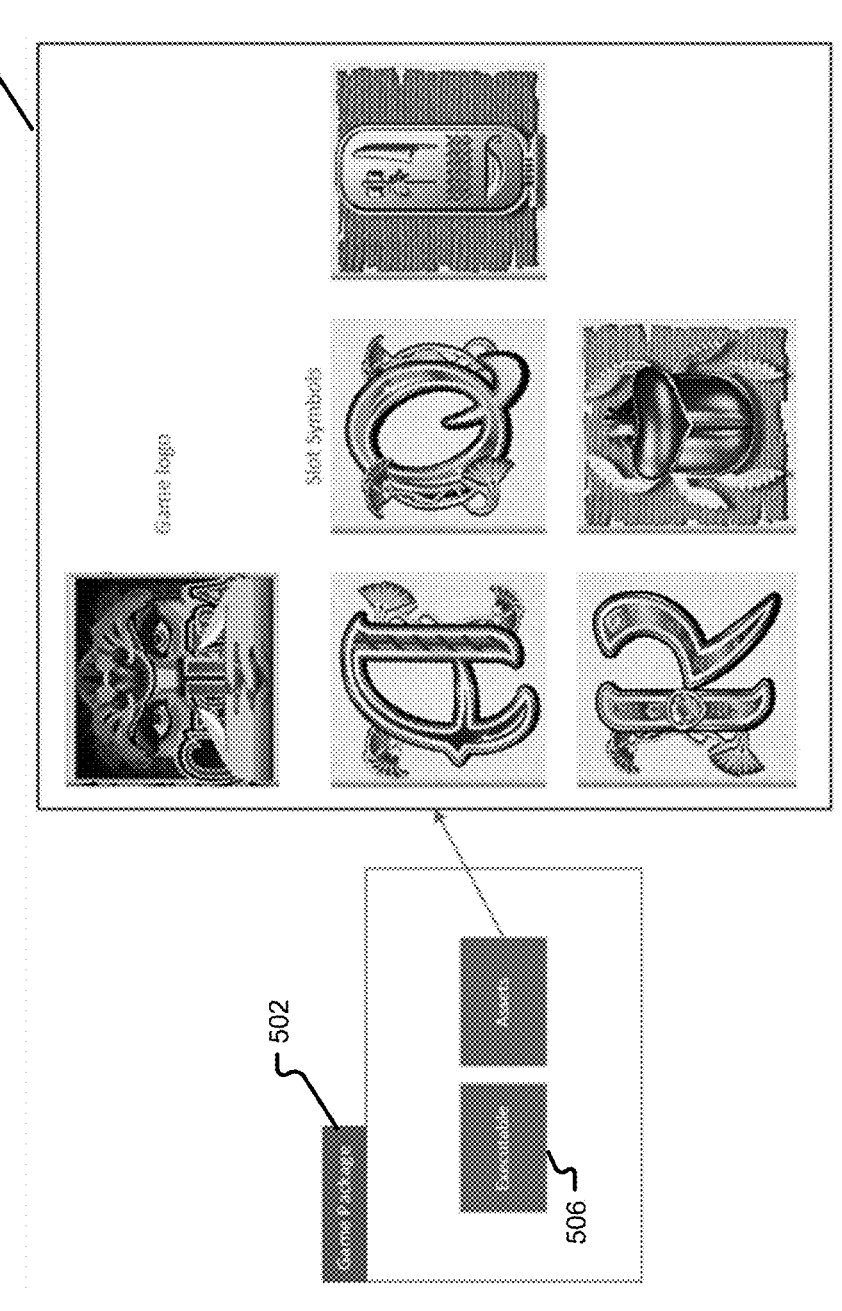
FIG. 5A is a block diagram depicting a game package in accordance with embodiments of the present disclosure.

FIG. 5A shows an example Cleopatra game package 502 containing a game logo and slot symbols (e.g., assets 504). The game package 502 may also include background images, particle effects, shader, paylines, wire frames, scripts, unity scenes, win animations, fonts, etc.

In one embodiment, the controller 110 can get the assets 504 and their tag ("game log", "slot symbol," "background," etc.) from the EGM 112 and include those in the customization. In one embodiment, the controller 110 first automatically creates the customization and then allows the operator to adjust it.

In one embodiment, the assets 504 are the standard assets used to play the game on the EGM 112. In one embodiment, the assets 504 are specifically designed to be used for the controller 110 customization. In one embodiment, the game package 502 includes technical aspects of the assets 504 such as the color depth, width, height, or format. For example, the controller 110 might need a 400 pixel by 400 pixel (square) logo and therefore queries the assets 504 from the game package 502 to find an appropriate match in exact pixel or aspect ratio (1:1).

Operator Customizes Images and Content

In one embodiment, the operator can use content (e.g., images, animations, video, sounds, etc.) from a database or upload their own content. The operator may search from content using keywords (e.g., ocean, safari, space), and the content is filtered and displayed based on the keywords. The operator can then select specific content for each portion (e.g., background, border, etc.). Additional content libraries (e.g., Christmas, Chinese New Year, Halloween, Valentine's Day, Fourth of July, etc.) can also be installed.

In one embodiment the operator provides their own content. Content may be uploaded using a thumb drive, a network drive, a website, a mobile application, etc. The operator uploads their content to the controller 110 for use.

Figure 4B:
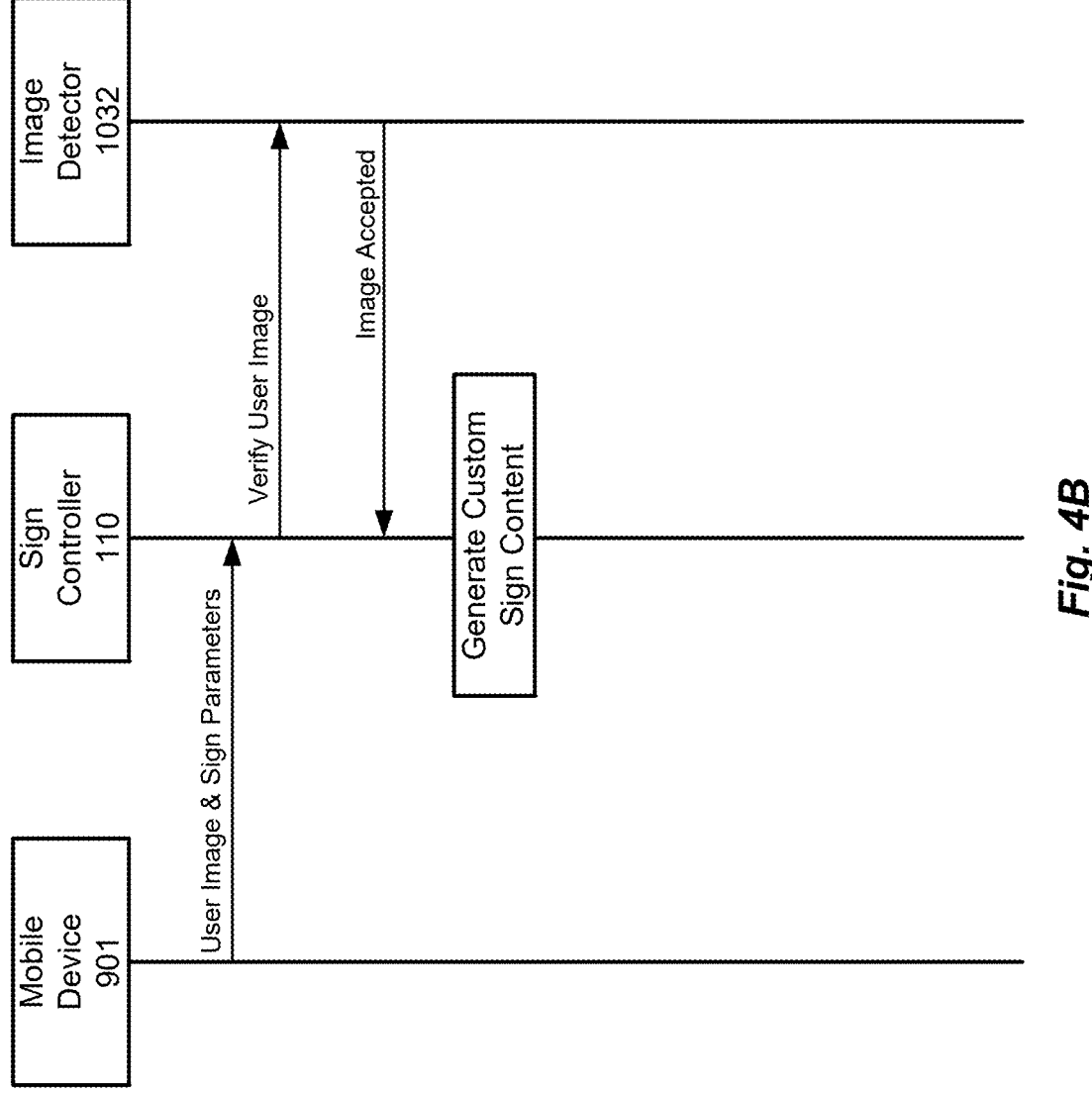
FIG. 4B is a diagram depicting a flow to verify whether content is restricted in accordance with embodiments of the present disclosure.
Figure 4C:
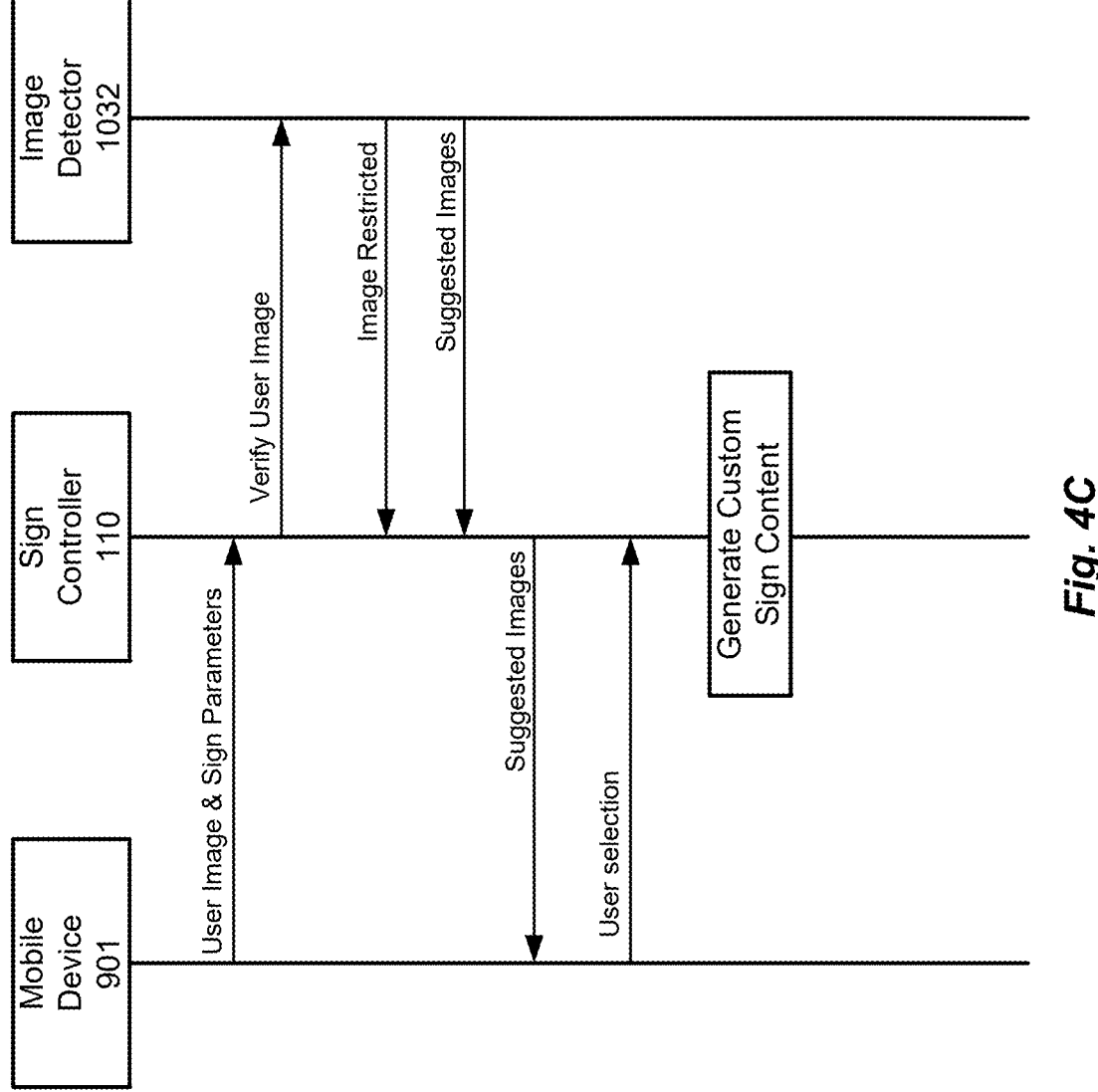
FIG. 4C is a diagram depicting another flow to suggest alternative content when content is restricted in accordance with embodiments of the present disclosure.

Detecting if the Content is Appropriate—FIGS. 4B-4C

One concern with allowing an operator to upload their own content is that the operator tries to use restricted content (e.g., copyrighted, inappropriate, etc.), content that does not match the game theme (e.g., using green and blue for an Asian themed game), or content that hurts the performance of the games on the bank (e.g., unappealing content).

In one embodiment, the controller 110 has an algorithm (e.g., image detector instruction set 1032) that determines if the operator uploaded images "match." Prompts might include "Are these images consistent with each other?" or "Are these images in the same style or theme?" In embodiments the prompts might include a target theme learned from the game. For example, the controller 110 learns that the games are Asian themed and asks, "Are these images consistent with an Asian theme?" The algorithm could determine if the selected images use the same palette or are of the same theme through analysis of the images. In one embodiment, the controller 110 uses an algorithm to determine if the content is appropriate. The controller 110 could allow the operator to provide the images, then prompt the algorithm to determine if the images are appropriate or restricted. The controller 110 might ask "Are these images copyrighted?" or "Who owns the copyright to these images?" to determine if the controller 110 can display the images. If the content is restricted, the controller 110 may suggest alternative content that are similar to the restricted content. For example, if the user uploads a copyrighted image, the algorithm may analyze the copyrighted image and suggest similar non-copyrighted images.

Operator Customizes Layout

In one embodiment the operator has the ability to move elements around using the touch screen, application or mobile device (e.g., the mobile device 901). In one embodiment, the mobile application or tablet application wirelessly communicates with the controller 110. The operator might be allowed to add or remove elements.

For example, the operator might touch, hold, and drag an element to position it differently. The operator might choose "Add Logo" and a logo element appears on the screen and the operator can edit, move, resize the logo element. The operator can customize any of position, height, width, opacity, brightness, contrast, hue, frame rate (for video elements), volume (for sound elements), etc. of sign elements.

Adjusting the Sign Layout to Game Configuration

The controller 110 may have a database of layouts of all possible layouts and their configurations. However, instead of letting the operator choose, and pick an incorrect layout, the controller 110 may narrow the available choices based on the configuration of the games on the bank. The controller 110 can learn this information either from the EGMs 112 themselves or from the game controller. For example, a gaming configuration may be marked "progressive," and the operator can only pick from the layouts marked "progressive."

The controller 110 could also narrow down the options by one or more of the following game configurations: game type (poker, slot, etc.), game denomination, number of progressive levels, etc.

Regulatory Impacts and Markets

The sign content may be stored in database. In one embodiment, the elements are marked with a regulatory indicator. For example, a layout could be marked to only work in Nevada or not work in Nevada. An element of the layout could be marked similarly, such as an element that must be present in the layout for a given market. For example, the progressive award is marked to always be shown in Nevada. In another example, the element might be a message such as a "win up to 500 credits." In one market, the message must be in credits while in another market it must be in dollars and cents "win up to $1000." In one embodiment, the controller 110 communicates with the EGMs 112 and adjusts its configuration accordingly. The controller 110 could learn the current market is configured to Spanish, uses the command separator for thousands and is in dollars and cents.

The sign controller may also limit access to certain settings based on permissions. For example, various casino brands (e.g., MGM, Caesars, etc.) are loaded in the program and a permission access code is required for each customer to only be able to select their branded content.

Tournament

In one embodiment, the operator provides multiple customizations. One customization is for regular (cash) gameplay and another is for tournament play. When the controller 110 learns there is a tournament, the controller 110 switches to tournament customizations and vice versa. The controller 110 can learn this from the game controller, the EGMs 112 or from a Tournament Host.

Figure 5B:
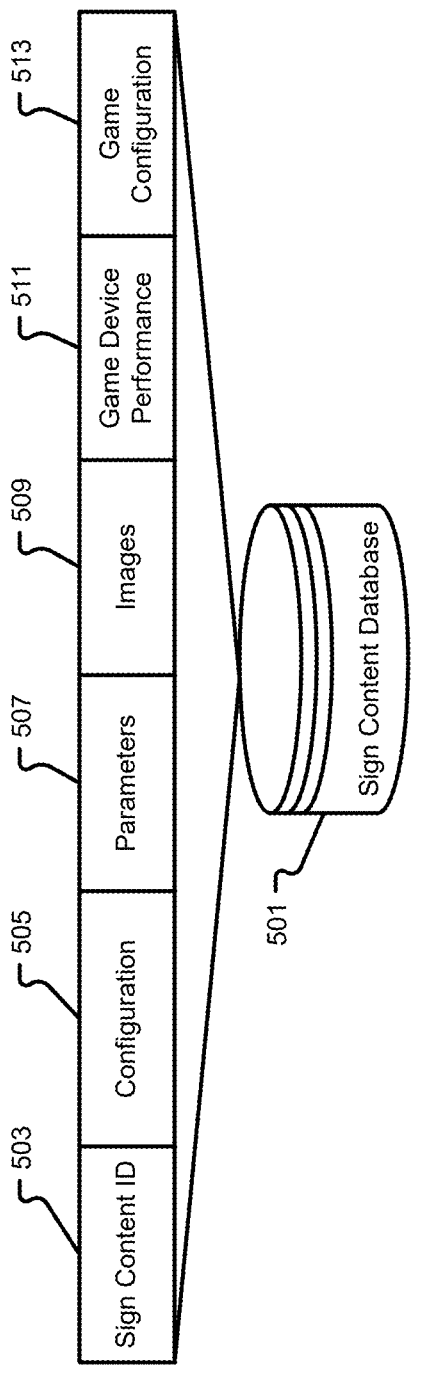
FIG. 5B depicts an example sign record in accordance with embodiments of the present disclosure.
Figure 5B:

With reference now to FIG. 5B, additional details of data structures will be described in accordance with at least some embodiments of the present disclosure. It should be appreciated that the data structures depicted and described herein may be stored within a central database or may be distributed among a number of data storage nodes. Alternatively or additionally, some or all of the fields of the data structures may be maintained in devices of the system without departing from the scope of the present disclosure.

With reference initially to FIG. 5B, details of a data structure 500 that may be maintained as part of a sign content record will be described in accordance with at least some embodiments of the present disclosure. The database 501 may be configured to store one or multiple data structures 500 that are used in connection with generating customized sign content. In some embodiments, the data stored in the data structure 500 may be stored for a plurality of different operators or for a single operator. As a non-limiting example, the data structure 500 may be used to store hardware configuration information, sign parameter information, and the like. Even more specifically, the data structure 500 may include a plurality of data fields that include, for instance, a record ID field 503, a configuration field 505, a parameters field 507, an images field 509, a performance field 511, and a game configuration field 513.

In one embodiment the operator can save or export a configuration (e.g., data structure 500) to a thumb drive, network drive or mobile application and then later import that onto the same or a different controller 110. This allows the operator to duplicate a common configuration across the casino floor.

The record ID field 503 may be used to store any type of information that identifies a customized sign content package. In some embodiments, the record ID field 503 may indicate an operator. The configuration field 505 may be used to store a number of sign components and a type, size, position, and location of each sign component. The parameters field 507 may be used to store sign parameters (e.g., sign theme, color, flair, attract, logo, etc.). The images field 509 may store images (from a connected database, uploaded by the user, from a game package) to be used in the customized sign content. The game device performance field 511 may store information related to performance (e.g., frequency of gameplay, duration of gameplay, wagers placed, payouts, etc.) of an EGM 112 or a bank 101 of EGMs 112. The game configuration field 513 may store information that identifies a layout of the EGMs 112 (e.g., pod, back-to-back, etc.) and associated sign components 120.

Figure 6:
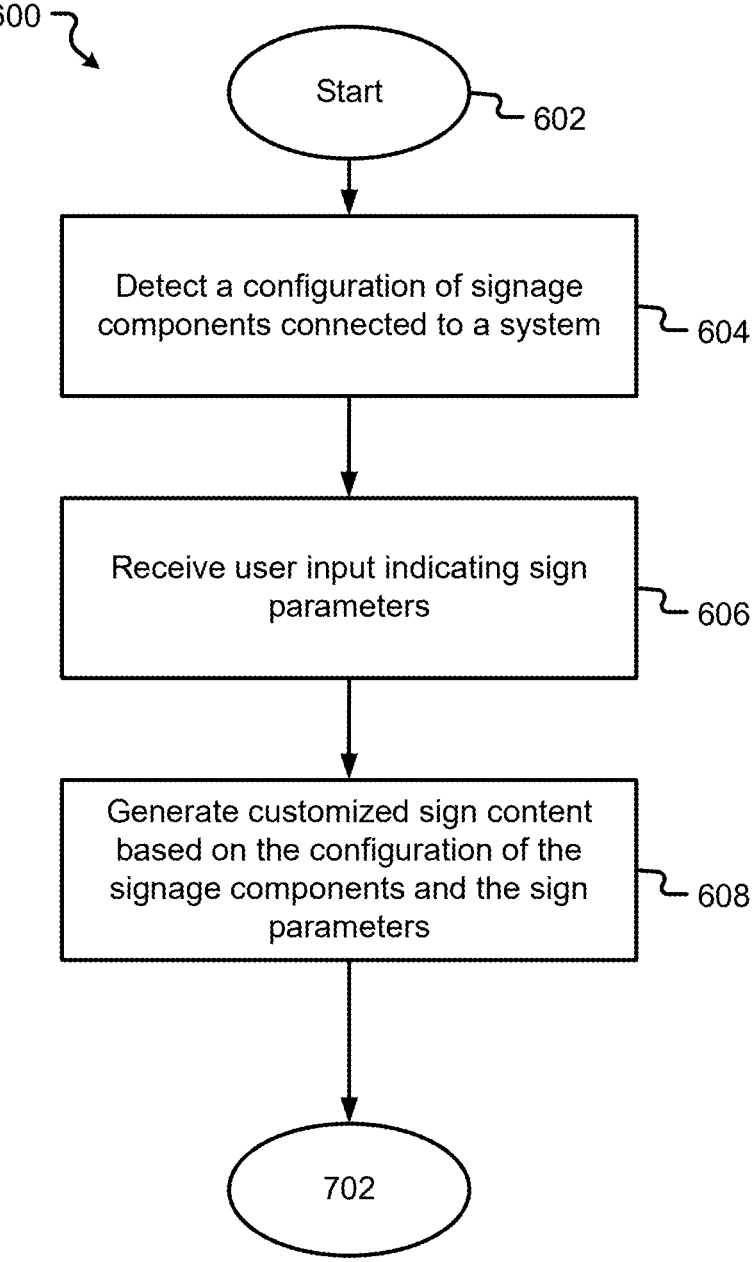
FIG. 6 is a flow diagram depicting a process of generating customized sign content in accordance with embodiments of the present disclosure.

With reference now to FIG. 6, a process 600 of generating customized sign content will be described in accordance with at least some embodiments of the present disclosure.

The order of operations depicted in FIG. 6 should not be construed as limiting embodiments of the present disclosure. For instance, certain steps may be performed in a different order without departing from the scope of the present disclosure. Furthermore, some steps may be performed in parallel (e.g., simultaneously) with one another.

The process 600 starts at step 602. In step 604 a configuration of sign components is determined. As previously mentioned, EGMs 112 and associated sign components 120 can be configured in various ways with a different numbers of EGMs 112 and sign components 120, different types of sign components 120 (wide, square, short, portrait, landscape, etc.), etc. The configuration of sign components 120 may include information regarding a type, size, orientation, position, and location of each sign component 120.

Content Adjusting to Hardware

In one embodiment the controller 110 has a database of layouts. The controller 110 learns the gaming configuration and narrows down or suggests a layout for the operator based on the detected hardware configuration (e.g., type and layout of EGMs 112, type and positioning of sign components 120). For example, the controller 110 detects three EGMs 112 configured in a "POD" configuration with three sign components 120 (one sign component 120 between each adjacent EGM 112). The controller may detect the hardware configuration based on Extended Display Identification Data (EDID) retrieved over monitor cable communication. The controller 110 then limits the operator selection to options that make sense for a three sign component pod configuration. In one embodiment the operator takes a picture of the bank and then uploads the picture to the controller 110. The controller 110 determines the hardware configuration from the picture(s).

In step 606, sign parameters (e.g., sign theme, color, flair, etc.) are received as user input. In step 608, customized sign content is generated based on the configuration of sign components and the sign parameters.

Figure 7:
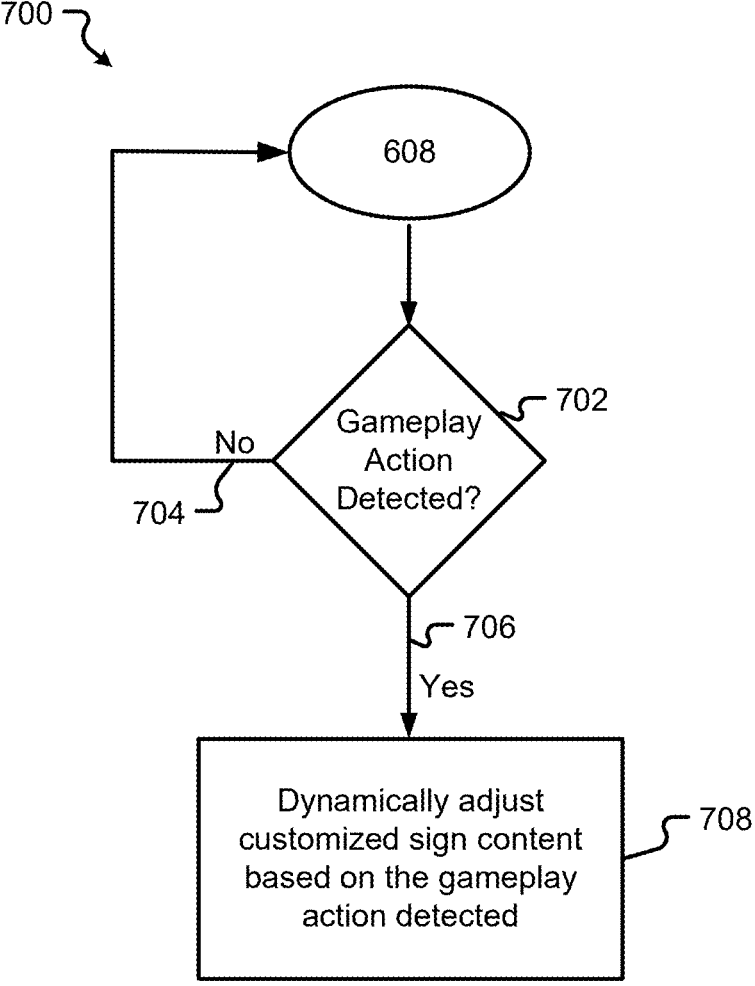
FIG. 7 is a flow diagram depicting a process of dynamically adjusting customized sign content based on gameplay activity in accordance with embodiments of the present disclosure.

With reference now to FIG. 7, a process 700 which continues from step 608 in the process 600 will be described in accordance with at least some embodiments of the present disclosure.

The order of operations depicted in FIG. 7 should not be construed as limiting embodiments of the present disclosure. For instance, certain steps may be performed in a different order without departing from the scope of the present disclosure. Furthermore, some steps may be performed in parallel (e.g., simultaneously) with one another.

From step 608, while monitoring the system, the system determines if there is a gameplay action detected (step 702). If there is no gameplay action is detected (step 704), the process 700 continues to monitor for a gameplay action. If there is a gameplay action detected (step 706) the customized sign content is dynamically adjusted based on the detected gameplay action (step 708). For example, a gameplay action may include winning a jackpot, the sign content may be adjusted to display a cascade of coins along with blinking lights and sounds.

Dynamic Content

The operator may also customize dynamic aspects of the sign. Dynamic aspects may change based on gameplay activity. For example, the operator might configure the controller 110 to shake the sign components 120 every five minutes once the jackpot is above $10,000. In another example, the operator might configure the background image to be a fire animation when the jackpot is above $11,000 and have the fire scale with the jackpot amount (more fire when the jackpot increases).

Figure 8:
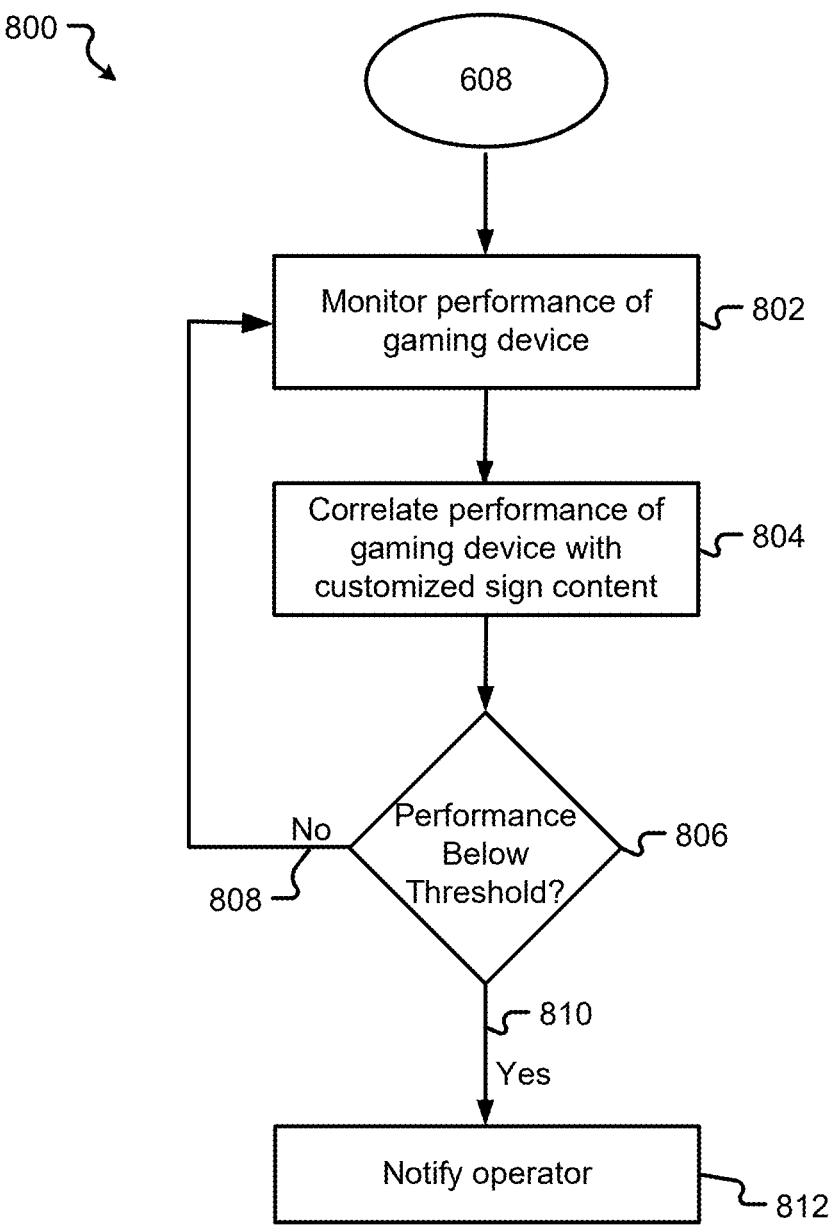
FIG. 8 is a flow diagram depicting a process of correlating game performance with customized sign content in accordance with embodiments of the present disclosure.

With reference now to FIG. 8, a process 800 which continues from step 608 in the process 600 will be described in accordance with at least some embodiments of the present disclosure.

The order of operations depicted in FIG. 8 should not be construed as limiting embodiments of the present disclosure. For instance, certain steps may be performed in a different order without departing from the scope of the present disclosure. Furthermore, some steps may be performed in parallel (e.g., simultaneously) with one another.

From step 608, the performance of a gaming device (e.g., the gaming device 112) is monitored (step 802). For example, performance may be frequency/duration of gameplay on a device. High performance may be frequent gameplay and/or long duration of gameplay. It may be inferred that the sign content may attract players to play the gaming device. Similarly, low performance may be infrequent gameplay and/or short duration of gameplay. The performance of the gaming device is correlated with customized sign content (step 804). In other words, how did the performance of the gaming device increase/decrease based on sign content? For example, game performance may increase/decrease after a change in sign content. If the performance increased, this may indicate that the sign content is attracting players to play the gaming device. Conversely, if the performance decreases, this may indicate that the sign content should be adjusted to improve performance. In step 806 the system determines if the performance is above/below a threshold. If the performance is not below a threshold (step 808), the method continues to monitor sign content (step 802). If the performance is below the threshold (step 810), the operator is notified (step 812). Additionally, the process 800 may suggest adjustments to the sign content to improve performance.

One concern is that the operator could choose a configuration that hurts the performance of the gaming device 112. For example, each EGM 112 could have a daily average of $200 of play. The operator adjusts the sign content and then the average daily play drops to $180.

To solve this problem, the system tracks the performance of the EGMs 112 before the sign customization and after the sign customization and acts on the difference.

For example, the controller 110 can query each gaming device 112 or a gaming controller to learn the number of games played, amount of money played, etc. for the entire bank or per EGM. The controller 110 can keep a weekly or daily database of these metrics. After the operator changes the sign content, the controller 110 can correlate any change in performance.

In one embodiment, if the performance drops by a certain amount or percentage, the controller 110 automatically reverts to the previous content or to a default content. For example, the bank is averaging $200 a day per EGM. After the customization, the controller 110 notes the change in performance and is configured to revert to a previous sign content at a drop in performance of 10% or more. The controller 110 detects the bank 101 has dropped to $150 per EGM 112 per day and therefore reverts the configuration back to the configuration associated with the $200 performance.

In one embodiment the controller 110 does not automatically change the sign content, but rather notifies the operator (e.g., via text, email, mobile application, etc.) of the change in performance. In another embodiment the controller 110 notifies the game manufacturer of the change in performance.

The controller 110 also notes improvements in performance. If the performance of the bank increases after a customization, the controller 110 notifies the operator. For example, the controller 110 messages the operator "You bank is doing 8% better after you customization on Mar. 15, 2024." Customized sign content with a certain level of improvement in performance may also be offered to other operators (e.g., via a sign content store).

Operator Menu Via Mobile Device

In embodiments the operator has the ability to access the configurable sign and all of its current and future menu options via a mobile device 901 such as a tablet or phone. This allows the operator to connect to the controller 110 and make quick changes to the customized sign content and or more easily add custom content as described herein.

The mobile device 901 may correspond to an operator's personal device. It should be appreciated that the mobile device 901 may be in communication with a gaming device 112, sign components 120, and controller 110. Non-limiting examples of the mobile device 901 include a cellular phone, a smart phone, a tablet, a wearable device, an augmented reality headset, a virtual reality headset, a laptop, a Personal Computer (PC), or the like.

Figure 9:
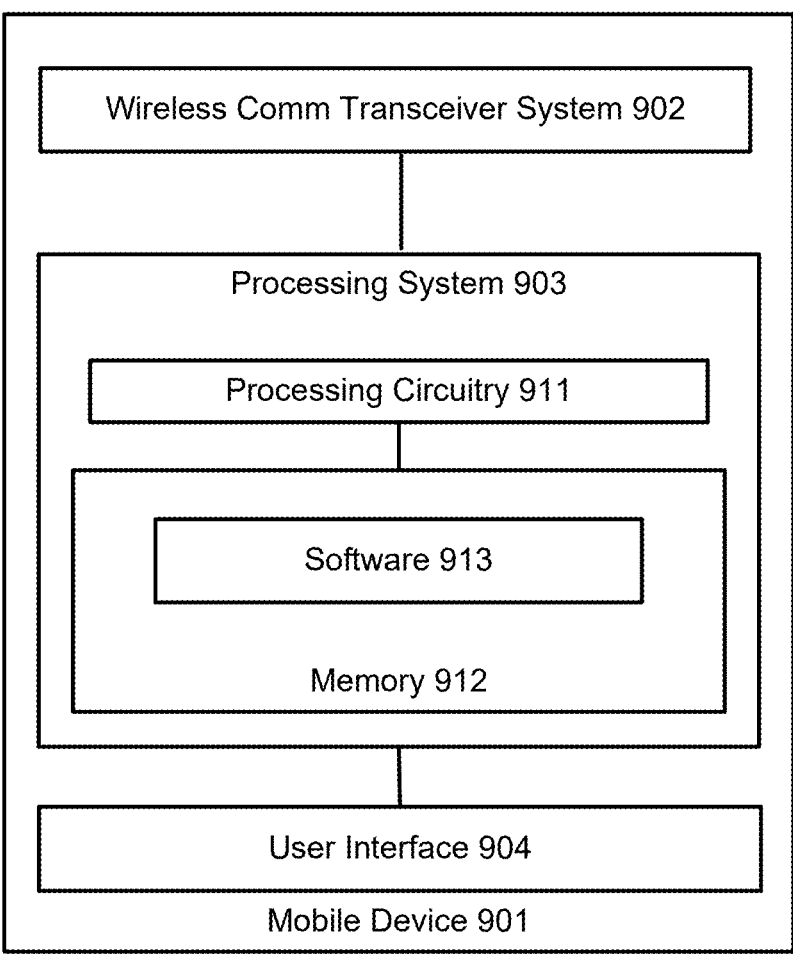
FIG. 9 is a block diagram depicting a mobile device in accordance with embodiments of the present disclosure.

With reference now to FIG. 9, a mobile device 901 in accordance with at least some embodiments of the present disclosure. Mobile device 901 comprises wireless communication transceiver system 902, processing system 903, and user interface 904. Processing system 903 is linked to wireless communication transceiver system 902 and user interface 904. Processing system 903 includes processing circuitry 911 and memory 912 that stores operating software 913. Mobile device 901 may include other well-known components such as a battery and enclosure that are not shown for clarity. Mobile device 901 may be a cellular phone, mobile phone, smartphone, personal digital assistant (PDA), computer, laptop, tablet, e-book, mobile Internet appliance, media player, game console, wearable computing device, wireless network interface card, or some other wireless communication apparatus-including combinations thereof.

Wireless communication transceiver system 902 comprises RF communication circuitry and an antenna. The RF communication circuitry typically includes an amplifier, filter, RF modulator, and signal processing circuitry. Wireless communication transceiver system 902 may also include memory, software, processing circuitry, or some other communication device. Wireless communication transceiver system 902 may use various communication formats, such as LTE, CDMA, EVDO, WIMAX, GSM, WIFI, HSPA, or some other wireless communication format-including combinations thereof.

User interface 904 comprises components that interact with a user to receive user inputs and to present media and/or information. User interface 904 may include a speaker, microphone, buttons, lights, display screen, touch screen, touch pad, scroll wheel, communication port, or some other user input/output apparatus-including combinations thereof. User interface 904 may be omitted in some examples.

Processing circuitry 911 comprises microprocessor and other circuitry that retrieves and executes software 913 from memory 912. Memory 912 comprises a non-transitory storage medium, such as a disk drive, flash drive, data storage circuitry, or some other memory apparatus. Processing circuitry 911 is typically mounted on a circuit board that may also hold memory 912, portions of wireless communication transceiver system 902, and user interface 904. Software 913 comprises computer programs, firmware, or some other form of machine-readable processing instructions. Software 913 may include an operating system, utilities, drivers, network interfaces, applications, or some other type of software.

When executed, software 913 directs processing system 903 to operate as described herein to allow the mobile device 901 to be in direct communication with other devices, such as devices 112 and 110.

Figure 10:
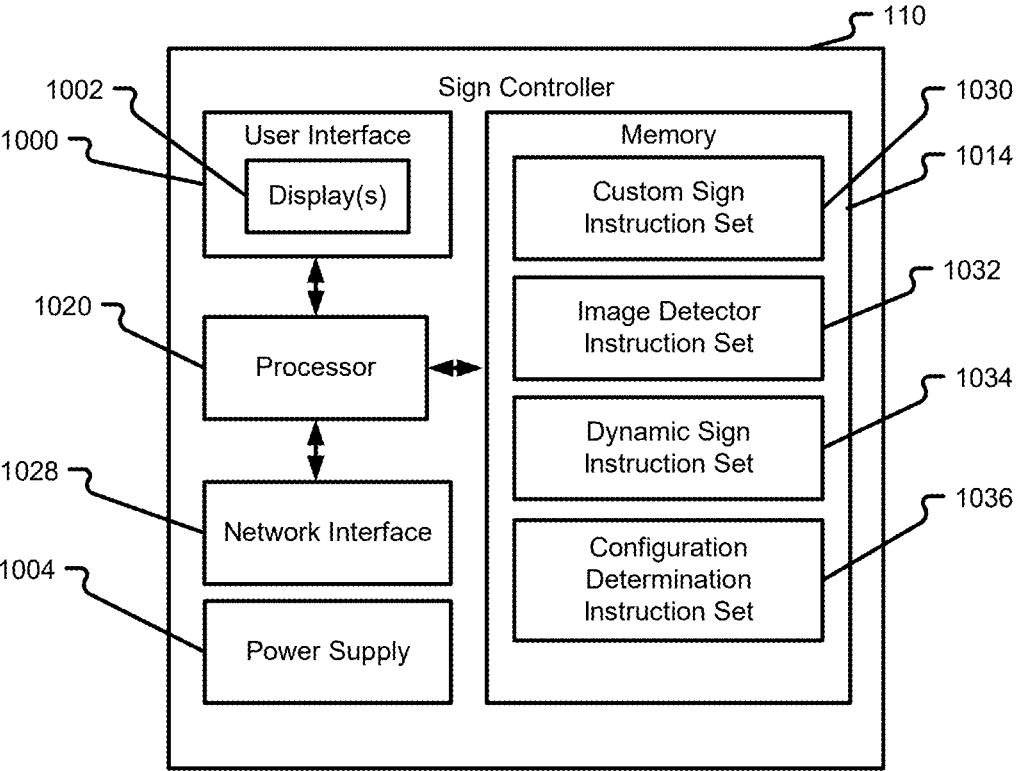
FIG. 10 is a block diagram depicting a sign controller in accordance with embodiments of the present disclosure.

With reference to FIG. 10, additional details of the components that may be included in a controller 110 will be described in accordance with at least some embodiments of the present disclosure.

The controller 110 is depicted to include a processor 1020, a network interface 1028, a user interface 1000 comprising one or more display devices 1002, a power supply 1004, and memory 1014. The processor 1020 may be configured to execute one or more instruction sets stored in memory 1014. The user interface 1000 may correspond to any type of input and/or output device that enables the operator to interact with the sign controller 110*a*. The display device 1002 may include a display driver, a power supply 1004, and/or other components configured to enable operation of the display device 1002. The display driver may receive commands and/or other data provided by the processor 1020 and one or more of the instruction sets in memory 1014. In response to receiving the commands, the display driver may be configured to generate the driving signals necessary to render the appropriate images to the display screen. The power supply 1004 may provide electric power to the components of the display device 1002. In some embodiments, the power supply 1004 may include a transformer and/or other electronics that prevent overloading, condition power signals, and/or provide backup power to the display device 1002. The input/output may include an interconnection to the network interface 1028. By way of non-limiting example, the input/output may include a high-definition multimedia interface (HDMI) input, Ethernet, composite video, component video, H.264, or other video connection. Non-limiting examples of the display device(s) may include, but are in no way limited to, a liquid crystal display (LCD), a light-emitting diode (LED) display, an electroluminescent display (ELD), an organic LED (OLED) display, and/or some other two-dimensional and/or three-dimensional display.

The memory 1014 may include one or multiple computer memory devices that are volatile or non-volatile. The memory 1014 may include volatile and/or non-volatile memory devices. Non-limiting examples of memory 1014 include Random Access Memory (RAM), Read Only Memory (ROM), flash memory, Electronically-Erasable Programmable ROM (EEPROM), Dynamic RAM (DRAM), etc.

The memory 1014 may be configured to store the instruction sets depicted in addition to temporarily storing data for the processor 1020 to execute various types of routines or functions. Examples of instruction sets that may be stored in the memory 1014 include a custom sign instruction set 1030, an image detector instruction set 1032, a dynamic sign instruction set 1034, and a configuration determination instruction set 1036.

In some embodiments, the custom sign instruction set 1030, when executed by the processor 1020, may enable the controller 110 to generate customized sign content based on configuration information and sign parameters.

In some embodiments, the image detector instruction set 1032, when executed by the processor 1020, may enable the controller 110 to determine whether content is suitable for use (e.g., not restricted) and suggest alternative content if the content is restricted.

The dynamic sign instruction set 1034, when executed by the processor 1020, may enable the controller 110 to dynamically adjust sign content based on gameplay activity, preset time intervals, and/or randomly.

The configuration determination instruction set 1036, when executed by the processor 1020, may enable the controller 110 to determine a configuration of hardware components (e.g., EGMs 112, sign components 120, etc.)

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed:

1. A system comprising:

a processor; and a memory coupled with and readable by the processor and storing therein instructions that, when executed by the processor, cause the processor to:

detect a configuration of sign components connected to the system;

receive user input indicating sign parameters, wherein the sign parameters available for user selection are based on a game configuration; and generate customized sign content based on the configuration of the sign components and the sign parameters.

2. The system of claim 1, wherein the configuration of the sign components comprises a type, position, and location of each sign component connected to the system.

3. The system of claim 1, further comprising instructions that, when executed by the processor, cause the processor to:

request game package information from a gaming device; and generate the customized sign content at least partially based on the game package information.

4. The system of claim 1, wherein the sign parameters comprise at least one of: position, height, width, opacity, brightness, contrast, hue, frame rate, and volume.

5. The system of claim 1, further comprising instructions that, when executed by the processor, cause the processor to:

display a first tier of sign parameters and receive a user selection; and display a second tier of sign parameters, wherein sign parameters displayed in the second tier are based on the user selection in the first tier.

6. The system of claim 1, further comprising instructions that, when executed by the processor, cause the processor to:

receive a user selection of a preconfigured game theme; and generate the customized sign content at least partially based on the preconfigured game theme.

7. The system of claim 1, wherein the customized sign content cycles through multiple designs.

8. The system of claim 1, further comprising instructions that, when executed by the processor, cause the processor to:

detect a gameplay action; and change the customized sign content based on the detected gameplay action.

9. The system of claim 1, further comprising instructions that, when executed by the processor, cause the processor to:

receive an image for use in the customized sign content;

determine that the received image is restricted for display; and in response to the received image being restricted for display, suggest an alternative image to display.

10. The system of claim 1, wherein the game configuration comprises a game type.

11. The system of claim 10, wherein the game configuration comprises at least one of: a game denomination and a jackpot type.

12. The system of claim 1, further comprising instructions that, when executed by the processor, cause the processor to:

track performance of a gaming device associated with the sign components; and correlate performance of the gaming device with the customized sign content.

13. The system of claim 1, further comprising instructions that, when executed by the processor, cause the processor to:

configure customized sign content that changes dynamically based on a trigger;

detect the trigger; and dynamically adjust the customized sign content based on the detected trigger.

14. The system of claim 1, further comprising instructions that, when executed by the processor, cause the processor to:

receive image data of sign components connected to the system;

identify each sign component connected to the system in the image data; and determine the configuration of the sign components connected to the system based on the image data.

15. A method, comprising:

detecting, by a processor, a configuration of sign components connected to a system;

receiving, by a processor, user input indicating sign parameters;

generating, by a processor, customized sign content based on the configuration of the sign components and the sign parameters;

monitoring, by a processor, performance of a gaming device associated with the sign components; and correlating, by a processor, the performance of the gaming device with the customized sign content.

16. The method of claim 15, further comprising:

configuring the customized sign content to change dynamically based on a trigger;

detecting the trigger; and dynamically adjusting the customized sign content based on the detected trigger.

17. The method of claim 15, further comprising:

receiving image data of sign components connected to the system;

identifying each sign component connected to the system in the image data; and determining the configuration of the sign components connected to the system based on the image data.

18. The method of claim 15, further comprising:

receiving an image for use in the customized sign content;

determining that the received image is restricted for display; and in response to the received image being restricted for display, suggesting an alternative image to display.

19. The method of claim 15, further comprising:

requesting game package information from a gaming device associated with the sign components; and generating the customized sign content at least partially based on the game package information.

20. The method of claim 15, wherein the customized sign content is configured to be dynamic based on gameplay actions, and the method further comprising:

detecting a gameplay action; and dynamically adjusting the customized sign content based on the detected gameplay action.

* * * * *